US008624955B2

(12) United States Patent
Watson et al.

(10) Patent No.: US 8,624,955 B2
(45) Date of Patent: Jan. 7, 2014

(54) TECHNIQUES TO PROVIDE FIXED VIDEO CONFERENCE FEEDS OF REMOTE ATTENDEES WITH ATTENDEE INFORMATION

(75) Inventors: Josh Watson, Seattle, WA (US); Simone Leorin, Redmond, WA (US); Paul Kwoka, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 13/152,086

(22) Filed: Jun. 2, 2011

(65) Prior Publication Data
US 2012/0306992 A1 Dec. 6, 2012

(51) Int. Cl.
*H04N 7/14* (2006.01)

(52) U.S. Cl.
USPC ............... 348/14.07; 348/14.08; 370/260; 379/202.01; 709/204; 715/716; 715/733

(58) Field of Classification Search
USPC ............ 348/14.01–14.16; 370/259–271, 370/351–357; 709/201–207, 217–248; 455/412.1–426.2, 456.1–466, 455/550.1–560, 575.1–575.9, 90.1–90.3
See application file for complete search history.

(56) References Cited

U.S. PATENT DOCUMENTS

| | | | |
|---|---|---|---|
| 5,745,161 A * | 4/1998 | Ito | 348/14.09 |
| 5,745,711 A * | 4/1998 | Kitahara et al. | 715/759 |
| 5,889,945 A | 3/1999 | Porter | |
| 6,128,649 A * | 10/2000 | Smith et al. | 709/217 |
| 7,454,460 B2 * | 11/2008 | Ivashin | 709/203 |
| 7,612,793 B2 * | 11/2009 | Potekhin et al. | 348/14.01 |
| 7,800,642 B2 * | 9/2010 | Eshkoli et al. | 348/14.08 |
| 8,274,543 B2 * | 9/2012 | Lindbergh | 348/14.01 |
| 2005/0099492 A1 * | 5/2005 | Orr | 348/14.08 |
| 2005/0144233 A1 * | 6/2005 | Kjesbu et al. | 709/204 |
| 2006/0200518 A1 * | 9/2006 | Sinclair et al. | 709/204 |
| 2007/0121530 A1 * | 5/2007 | Vadlakonda et al. | 370/260 |
| 2007/0188596 A1 * | 8/2007 | Kenoyer | 348/14.08 |
| 2007/0279483 A1 | 12/2007 | Beers | |
| 2007/0279484 A1 | 12/2007 | Derocher | |
| 2007/0285506 A1 * | 12/2007 | Schneider | 348/14.08 |
| 2008/0062252 A1 * | 3/2008 | Kawamura et al. | 348/14.09 |
| 2010/0037151 A1 | 2/2010 | Ackerman | |
| 2010/0228825 A1 | 9/2010 | Hegde | |
| 2010/0235446 A1 | 9/2010 | Hehmeyer | |
| 2011/0115876 A1 * | 5/2011 | Khot et al. | 348/14.09 |
| 2011/0279629 A1 * | 11/2011 | Khot et al. | 348/14.08 |

OTHER PUBLICATIONS

Web conferencing with Adobe ConnectNow—Retrieved Date: Feb. 22, 2010, 10 pages. http://help.adobe.com/en_US/Acrobat.com/Using/WSCB361D26-AD4E-4afb-B79E-CA4FE1AEA81A.html.
Will Telepresence Save Videoconferencing?—Retrieved Date: Feb. 23, 2010, 4 pages. http://proavmagazine.com/audiovisual-equipment/will-telepresence-save-videoconferencing.aspx.

* cited by examiner

*Primary Examiner* — Hemant Patel (57) ABSTRACT

Techniques are described to provide a fixed video feed display from a remote participant to a conference room, where the display further includes remote participant information. In one embodiment, for example, a method may include receiving a connection from a remote participant, retrieving metadata related to the remote participant, and displaying a video feed from the remote participant along with the metadata in a dedicated position in a conference room. The metadata may provide information about the remote participant, as well as points of interest that may aid in conversation with the remote participant. The remote feed remains in the dedicated position throughout the conference, creating the effect of the remote participant being in the room. Other embodiments are described and claimed.

19 Claims, 9 Drawing Sheets

```
RECEIVE CONNECTION FROM A REMOTE PARTICIPANT TO A
VIDEO CONFERENCE
702

RETRIEVE METADATA ABOUT THE REMOTE PARTICIPANT
704

BUILD A CONSOLIDATED VIDEO FEED WITH THE
METADATA AND VIDEO RECEIVED FROM THE REMOTE
PARTICIPANT
706

SELECT A DEDICATED POSITION IN A CONFERENCE ROOM
FOR DISPLAYING THE CONSOLIDATED VIDEO FEED
708

DISPLAY THE CONSOLIDATED VIDEO FEED IN THE
DEDICATED POSITION
710
```

TECHNIQUES TO PROVIDE FIXED VIDEO CONFERENCE FEEDS OF REMOTE ATTENDEES WITH ATTENDEE INFORMATION

BACKGROUND

Video teleconferences typically involve participants in at least two different locations, where each participant may be able to see the others via a video feed from a video camera in the room with the participant. In some teleconferences, a group of participants may be present in one conference room, while one or more participants take part from remote locations. The video feed from the remote participant(s) to the conference room may change as different remote participants become active, e.g. when speaking. If there are multiple video feeds from remote sources, the positions of the feeds may move among different displays. It may be difficult for the participants receiving the remote video feed to retain a context for the remote participants. Further, passive participants may not appear on any video feed, and the conference room participants may forget about their presence. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to provide a fixed video feed display from a remote participant to a conference room. Some embodiments are particularly directed to techniques to provide a fixed video feed display from a remote participant to a conference room, where the display further includes remote participant information to facilitate interaction among the participants. In one embodiment, for example, an apparatus may comprise a metadata retriever operative on a logic device to retrieve metadata about a remote participant connecting to a video conference; and a video feed builder operative on the logic device to build a consolidated video feed from video information received from the remote participant and the retrieved metadata and to output the consolidated video feed to a display. The apparatus may also include a video conferencing module to receive a connection from the remote participant and to select a dedicated position in a conference room for displaying the consolidated video feed. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Conventional video teleconferencing systems may only display remote participants that are also actively participating, e.g. speaking. As the speakers change, the video feeds may be swapped so that the new speaker is shown, usually at the expense of showing the previous speaker. Consequently, it can be difficult for the room participants to keep track of who is participating remotely, and addressing a remote participant from the conference room may be awkward, as there is no physical place to focus an address. The remote participants may not feel like they have a consistent presence in the room. Further, the room participants may not know the remote participant and may have trouble engaging in conversation with them. The embodiments described herein address these and other issues with conventional systems.

Various embodiments are directed to providing a fixed video feed display from a remote participant to a conference room, where the display further includes remote participant information. In one embodiment, for example, a method may include receiving a connection from a remote participant, retrieving metadata related to the remote participant, and displaying a video feed from the remote participant along with the metadata in a dedicated position in a conference room. The metadata may provide information about the remote participant, as well as points of interest that may aid in conversation with the remote participant. The remote feed remains in the dedicated position throughout the conference, creating the effect of the remote participant being in the room.

Figure 1:
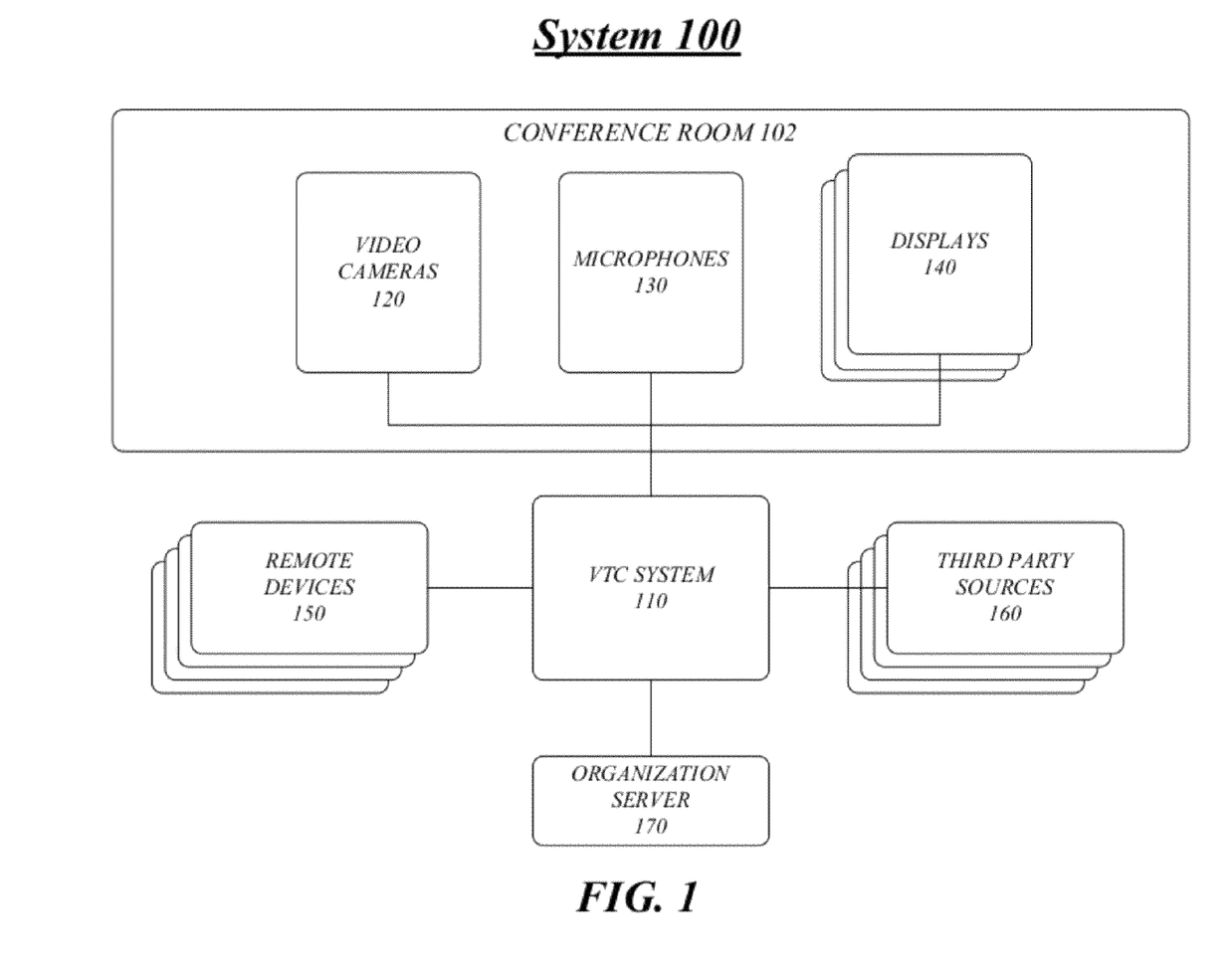
FIG. 1 illustrates an embodiment of a first system.

FIG. 1 illustrates a block diagram for a system 100 to provide a fixed video feed display from a remote participant to a conference room during a video teleconference (VTC), where the display further includes remote participant information. In one embodiment, for example, the system 100 may comprise a computer-implemented system 100 having one or more components, such as VTC system 110, video cameras 120, and remote devices 150. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, the system 100 may include a video teleconferencing (VTC) system 110. VTC system 110 may be operative to coordinate a VTC by receiving audio, video, and data information from a conference room and remote devices 150, and transmitting the information among the conference room and remote devices 150. VTC system 110 may include one or more electronic devices capable of operating a video teleconference. VTC system 110 may additionally manage information about who is participating, detect an active speaker, arrange a display of the different video feeds, and other functions of a VTC system. VTC system 110 is described in greater detail with reference to FIG. 2.

System 100 may include various components physically located in a physical conference room 102. The conference room 102 may include, by way of example, one or more video cameras 120, microphones 130, and displays 140. The conference room 102 may also include other types of conference room equipment, such as white boards, projectors, lighting systems, security systems, and so forth. The embodiments are not limited in this context.

Video cameras 120 may include any digital camera capable of capturing video information from a defined field of view and providing the video information to VTC system 110. Examples of digital cameras may include, for example, a fixed camera, a pan-tilt-zoom (PTZ) camera, a camcorder, a tabletop camera, a 360 degree camera, a webcam, a laptop computer built-in camera, a cell phone camera, and so forth. In some embodiments, video cameras 120 may be simple video cameras that record and/or transmit video to VTC system 110 of the participants in the room for a video teleconference, without any internal processing of the video images.

Microphones 130 may include any audio input device capable of capturing audio information from an area and providing the information to VTC system 110. Microphones 130 may include, for example, microphones built into a camera, table-top microphones, wearable microphones, cell phone microphones, microphone arrays, and so forth.

Displays 140 may include any device capable of showing video, audio, and/or computer data to the participants in the conference room. The material to be displayed may be received from VTC system 110. Displays 140 may include, for example, televisions, computer monitors, projection systems, cell phone screens, a liquid crystal display, a plasma display, and so forth. Displays 140 may show the various video feeds from other VTC devices in the conference, including video feeds from remote devices 150. In an embodiment, displays 140 may also comprise speakers for the audio information.

Remote devices 150 may include electronic devices capable of communicating with VTC system 110. Embodiments of a remote device 150 may include a camera, such as a web cam, a cell phone camera, or other cameras described above. Embodiments of a remote device 150 may also include a built-in microphone, or a connection to an external microphone. Embodiments of a remote device 150 may be coupled to an external camera and be capable of transmitting the camera feed and an audio feed form a microphone to VTC system 110. Remote devices 150 may further be capable of displaying information received from VTC system 110, such as video and audio feeds from conference room 102, presentation materials, documents, and other components of a VTC. Remote devices 150 may have a VTC client application operative on the device to coordinate VTC functions with VTC system 110. In an embodiment, a remote participant may connect to a VTC using both a telephone and a remote device 150.

System 100 may include third party sources 160. Third party sources 160 may include servers, web sites and so forth that VTC system 110 may access and retrieve information from. Third party sources 160 may include, for example, news websites, weather websites, social networking websites, search engines, and so forth. Third party sources 160 may generally be operated by entities separate from an entity operating VTC system 110, or from the entity hosting a particular video teleconference.

System 100 may include an organization server 170. Organization server 170 may include one or more servers or other storage devices that store information related to the entity hosting a video teleconference. Organization server 170 may include, for example, a business information server, a communication server, a directory server, an employee database, and so forth. Organization server 170 may include information about participants in a VTC, such as titles, contact information, locations, position in an organization structure, and so forth.

In an embodiment, VTC system 110 may access third party sources 160 and/or organization server 170 to retrieve metadata about a remote participant. For example, VTC system 110 may access organization server 170 to retrieve a name, location, title, and/or photograph of a remote participant who has connected to an active VTC. VTC system 110 may access third party sources 160 to retrieve information such as, but not limited to, the weather at the remote participant's location, local news from the location, local sports results, the remote participant's social networking feed, blog entries written by the remote participant, and so forth. The metadata retrieved about the remote participant may be helpful in facilitating interaction with the other VTC participants. VTC system 110 may combine the metadata with a video feed of the remote participant in a display to the other participants of the VTC.

Figure 2:
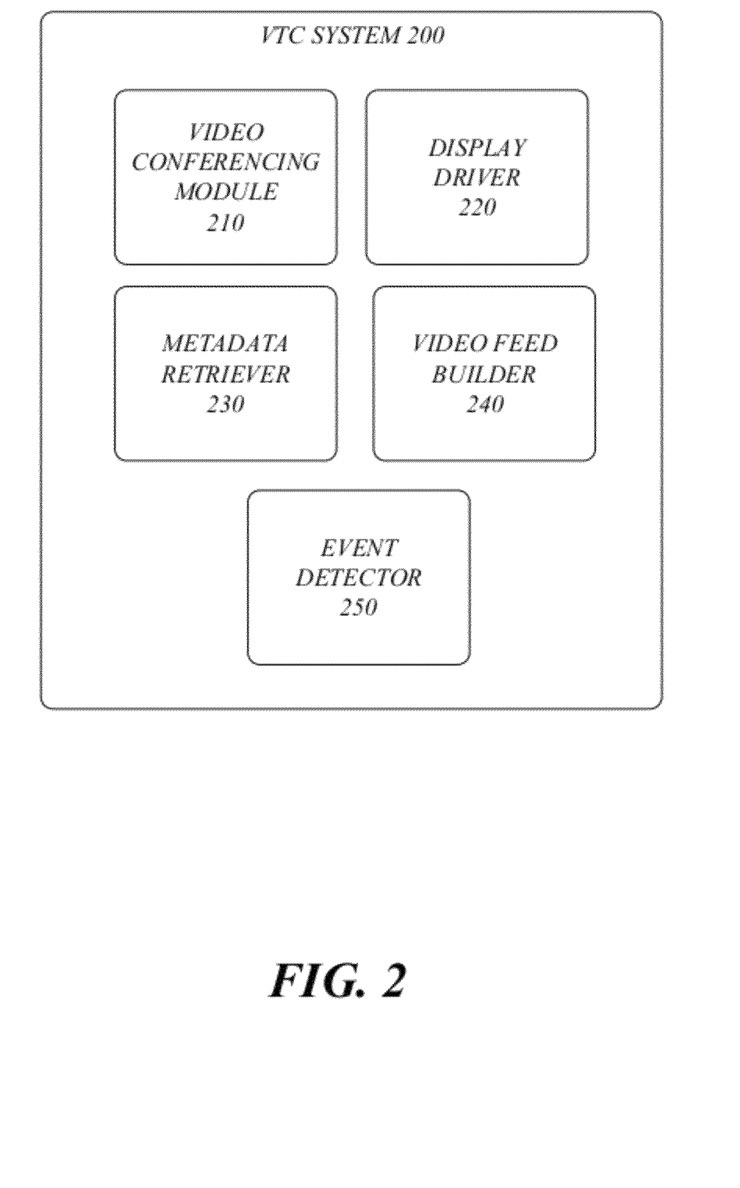
FIG. 2 illustrates an embodiment of a VTC system.

FIG. 2 illustrates a block diagram of a video teleconferencing (VTC) system 200. VTC system 200 may comprise an exemplary embodiment of VTC system 110 as described with reference to FIG. 1. VTC system 200 may include one or more components, such as a video conferencing module 210, a display driver 220, a metadata retriever 230, a video feed builder 240, and an event detector 250.

Video conferencing module 210 may perform the coordinating tasks of operating a VTC. In particular, video conferencing module 210 may receive metadata about a remote participant and a video feed from the remote participant, and may instruct display driver 220 to send the video feed and the metadata from the remote participant to a dedicated position on a display in the conference room. Video conferencing module 210 may receive video and audio information from the conference room and transmit it to remote devices 150. Video conferencing module 210 may provide collaboration services, such as document editing, or brainstorming exercises among the participants of the VTC. The embodiments are not limited to these examples.

Display driver 220 may receive one or more video feeds from video conferencing module 210 and may cause the video feeds to be displayed on specified displays in the conference room.

Metadata retriever 230 may connect with information sources, such as organization server 270 and third party sources 160 to search for and retrieve metadata about or relevant to a remote participant. For example, from a remote participant's location, metadata retriever 230 may search for and retrieve weather and news for that location. Metadata retriever 230 may use the email address and/or name for a remote participant to search for social networking or blog entries made by or about the remote participant. Metadata retriever 230 may then provide the retrieved metadata to video conferencing module 210 and/or video feed builder 240.

Video feed builder 240 may receive the video feed of the remote participant and the retrieved metadata and may generate a consolidated video feed that includes the video feed and some or all of the metadata. If the remote participant has no video feed, then video feed builder 240 may generate a video feed using, for example, a photograph of the remote participant retrieved with the metadata, and the rest of the metadata. In an embodiment, the consolidated video feed may include active links, such as, for example, to a news story, or the remote participant's blog. The metadata portion of the consolidated video feed may be dynamic, updating periodically with new metadata items, or providing a news-ticker-like scroll of text. In an embodiment, the remote participant may be allowed to specify which items of metadata to display in their video feed, for example, during the connection process of joining the VTC. If the remote participant has specified which items of metadata to display, video feed builder 240 may use that specification to construct the consolidated video feed.

In an embodiment, video feed builder 240 may combine consolidated video feeds from multiple remote participants into one tiled video feed, for example, if there is only one display available in a conference room.

In an embodiment, VTC system 200 may include an event detector 250 that may detect the occurrence of an event in the conference room, such as a room participant standing at a white board in the room. Event detector 250 may include logic that detects, from video information coming from the in-room cameras, events of interest that occur in conference room 102 during a VTC. Event detector 250 may detect, for example, an active speaker, a location or item in the room that the participants are looking at, a presenter standing near a board or display, a participant standing in a specific location in the room, and so forth. When an event is detected, video conferencing module 210 may direct display driver 220 to move the feed from the remote participant to a second location in the room closer to the event, such that the remote participant may continue to be a visible presence in the conference.

The components 210, 220, 230, 240, and 250 may be communicatively coupled via various types of communications media to each other and to video cameras 120, microphones 130, and displays 140. The components may coordinate operations among each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Figure 3:
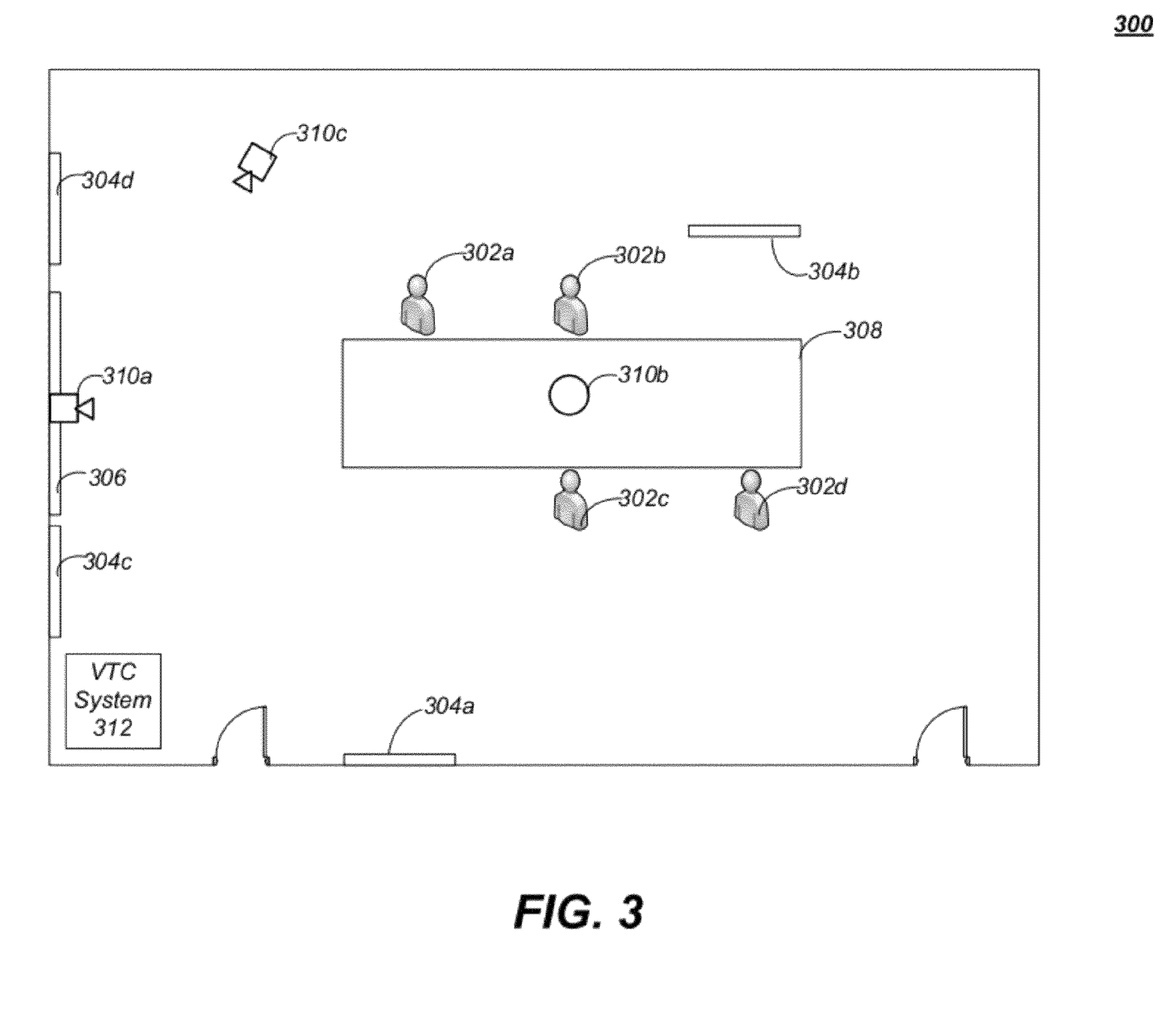
FIG. 3 illustrates an embodiment of a conference room.

FIG. 3 illustrates a top-view diagram of an example of a conference room 300. Conference room 300 may include participants 302a, 302b, 302c, and 302d seated around a table 308. Conference room 300 may include displays 304a, 304b, 304c, and 304d in various positions around the room. Conference room 300 may also include a board 306, such as a white board, a chalk board, a smart white board, or other presentation surface. Conference room 300 may also include cameras 310a, 310b, and 310c to generate video feeds of the conference taking place in conference room 300.

During a conference, a consolidated video feed from a remote participant may be displayed, for example, on display 304b. In an embodiment, if the focus of the conference changes from table conversation to a presentation on board 306, VTC system 312 may detect the change as an event, and may move the consolidated video feed from display 304b to, for example, display 304c, so that the in-room participants 302 can see the remote participant while looking at board 306.

If there is more than one remote participant, each may be displayed on a separate display, e.g. on 304a, 304c and/or 304d. If there are not enough displays to dedicate one for each remote participant, VTC system 312 may send more than one consolidated video feed to a display, for example, in a mosaic or tiled arrangement.

Figure 4:
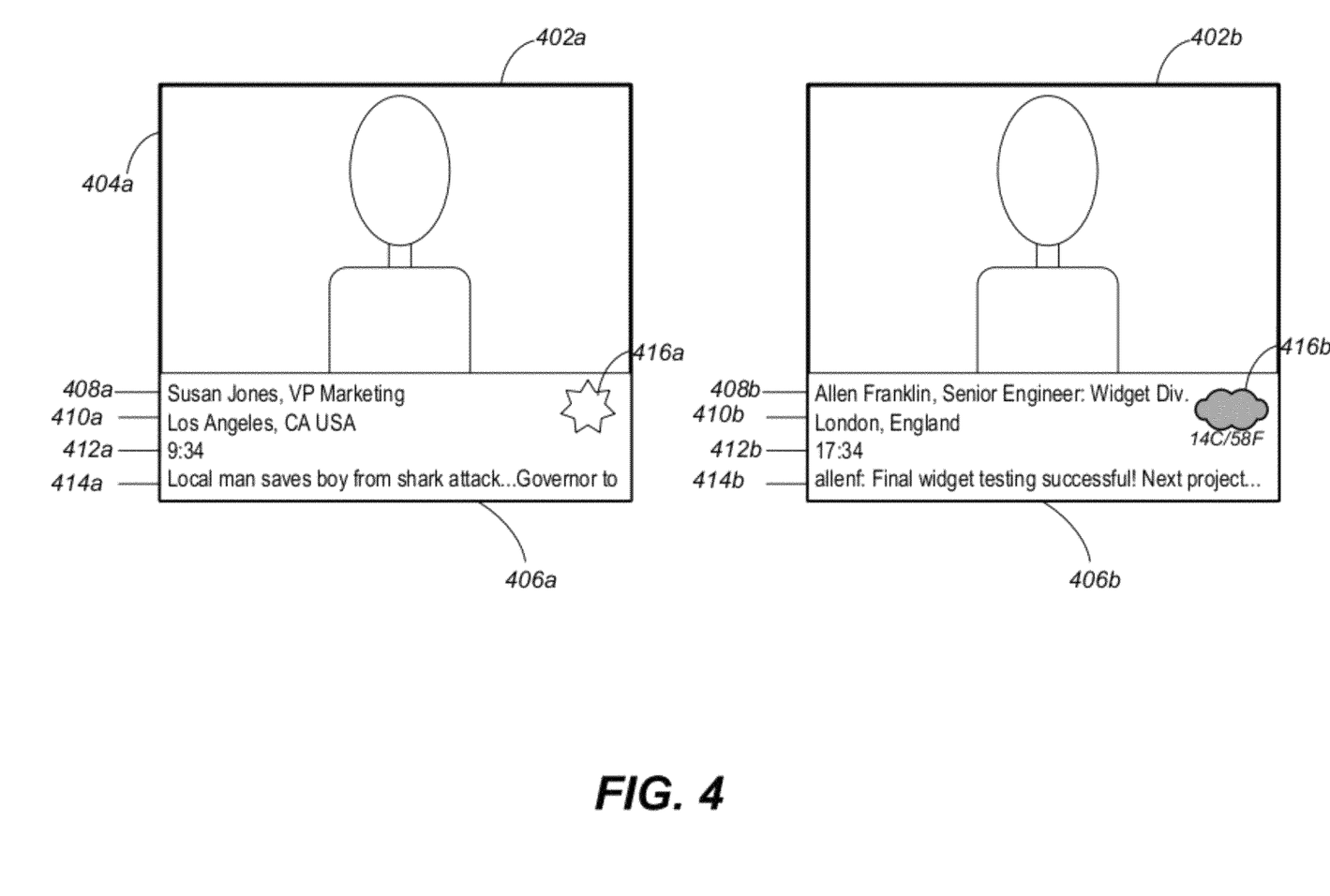
FIG. 4 illustrates an embodiment of a video feed from a remote participant.

FIG. 4 illustrates an example of consolidated video feeds displayed on two separate displays 402 and 404. Each consolidated video feed may include a video portion 404a, 404b that displays the output of a video camera at the remote participant's site, showing the remote participant. In the event that a remote participant does not have an on-site camera, a photographic image of the remote participant may be displayed in video portion 404a, 404b instead.

The consolidated video feed may also include a metadata portion 406a, 406b. The metadata portion may display information about the remote participant, and information related to the remote participant or the remote participant's location. For example, metadata portion 406a includes a name and title for the remote participant in line 408a; a geographic location in line 410a; a local time in line 412a; and local news headlines presented in a scrolling line 414a. Metadata portion 406a also includes a weather icon 416a to illustrate current local weather conditions. In the alternative, weather icon 416a may be replaced with text, e.g. "85F; sunny."

Metadata portion 406b may include information similar to metadata portion 406a, such as a name and title in line 408b, a location in line 410b, and a local time in line 412b. In 414b, metadata portion 406b may include information from a social networking account belonging to the remote participant, e.g. a TWITTER feed. Additional or alternate metadata may be displayed. The embodiments are not limited to these examples.

Figure 5:
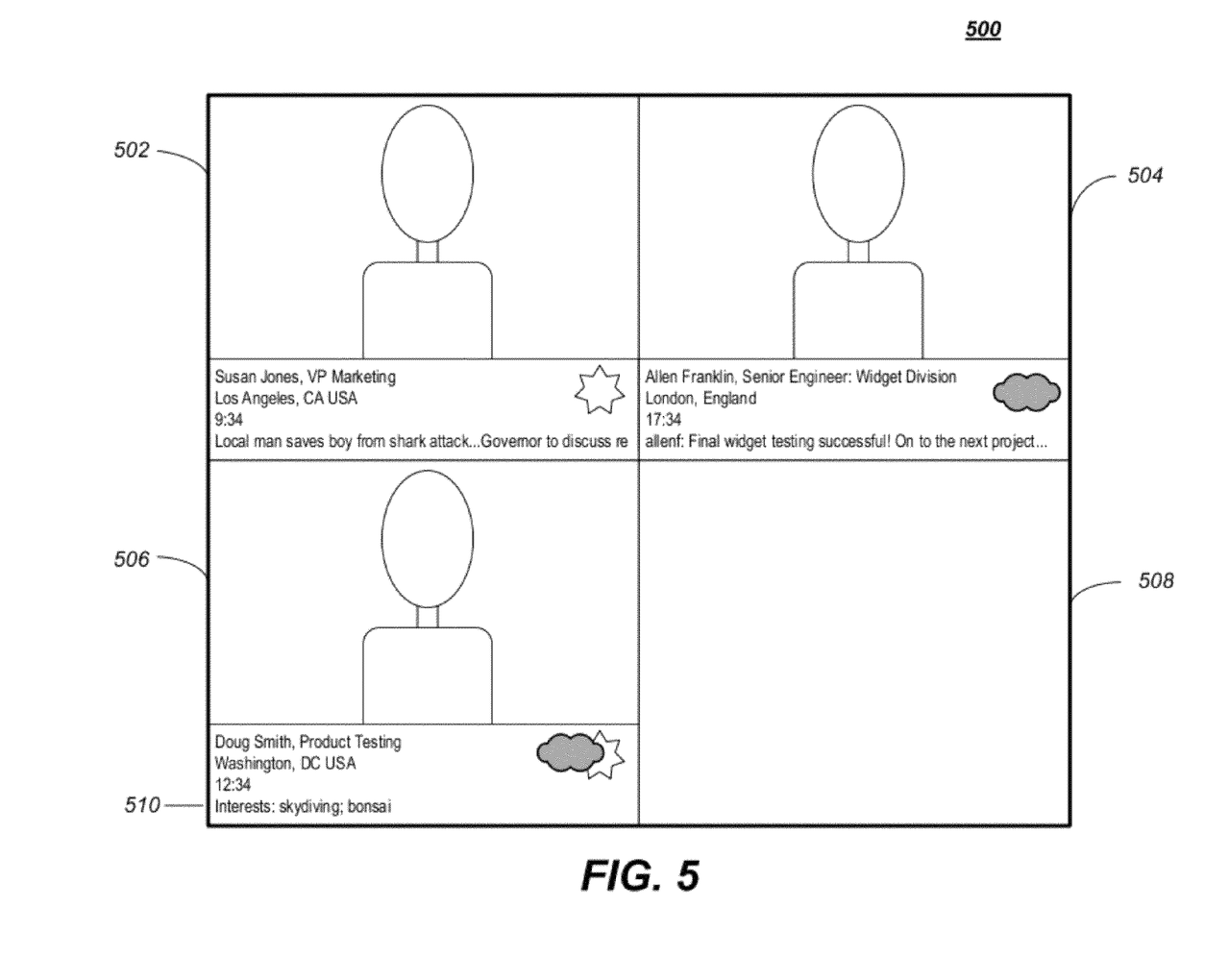
FIG. 5 illustrates a second embodiment of a video feed from a remote participant.

FIG. 5 illustrates an example of consolidated video feeds displayed on one display 500. In the example, there are three remote participants, but only one display is available. VTC system 110 may direct video feed builder 240 to divide a video feed into enough equal-sized sections to accommodate the number of remote participants, e.g. four sections 502, 504, 506 and 508 in this example. Video feed builder 240 may then assign one remote participant to one section of the video feed as a dedicated location for that remote participant. Unused sections, e.g. section 508, may be left blank, or may be filled with other conference related material, a company logo, and so forth.

The consolidated video feed shown in section 506 includes another example of metadata that may be displayed. In line 510, an interests list may be displayed, for example, from an employee profile, or a social networking site profile.

Figure 6:
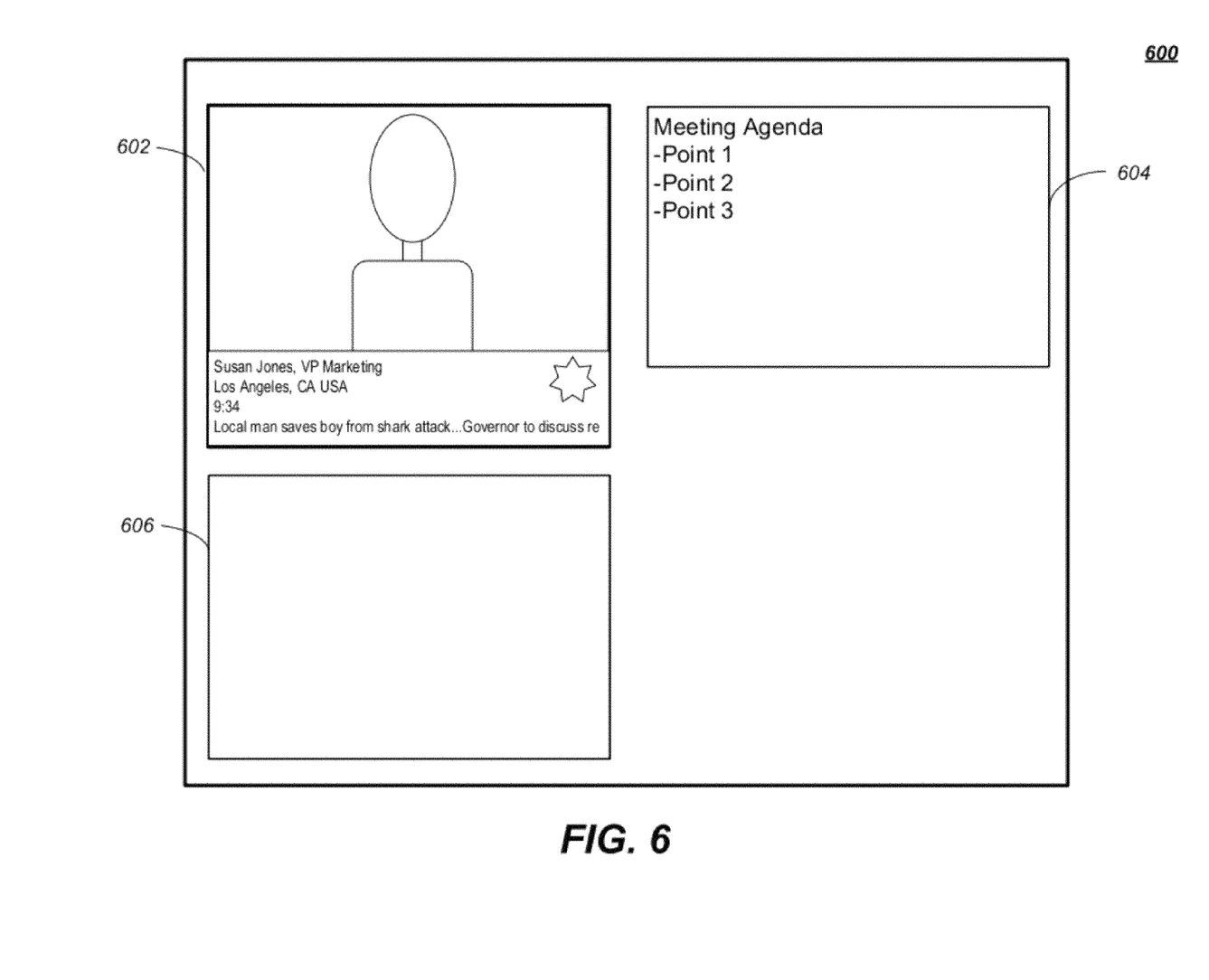
FIG. 6 illustrates a third embodiment of a video feed from a remote participant.

FIG. 6 illustrates an example of a consolidated video feed displayed as a component of an application operating on a remote device 150. The application may include a user interface visible on a display 600. The application may be, for example, a video teleconferencing application or a web browser application. In an embodiment, the application may provide one or more windows such as windows 602, 604 and 606. The application may reserve one window, e.g. window 602, to be dedicated to displaying a consolidated video feed, for example, from another remote participant. Other windows may display other conference related materials. For example, window 604 may display a meeting agenda. Window 606 may display other remote participant consolidated feeds, a video feed from the conference room, presentation materials, chat interfaces, and so forth. In an embodiment, windows that display a consolidated video feed may be fixed so that they remain on top and visible for the duration of the connection to the conference, fixed so that they cannot be moved to another location on display 600, and/or fixed so that they cannot be resized. The embodiments are not limited to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 7:
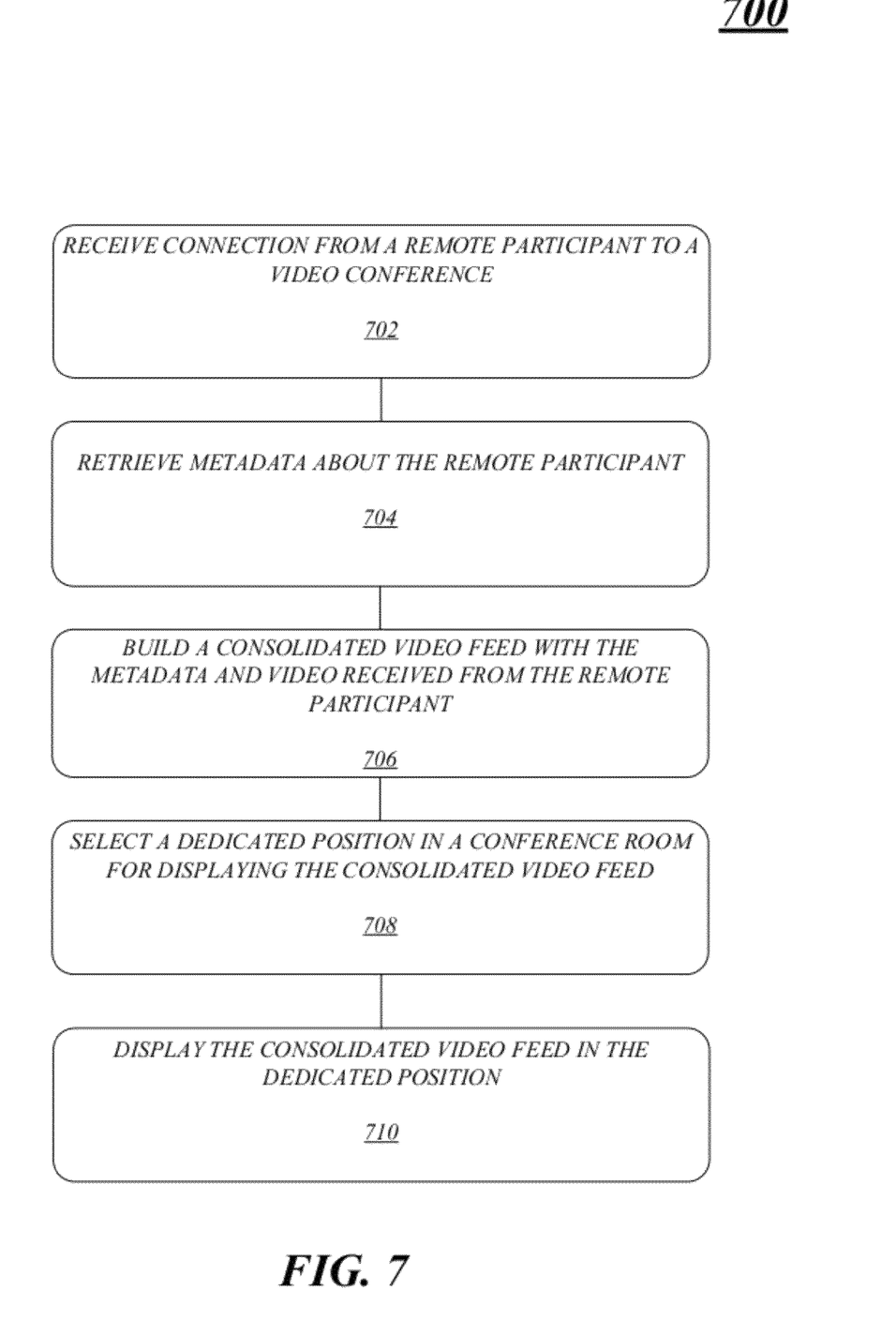
FIG. 7 illustrates an embodiment of a logic flow.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a connection from a remote participant to a video teleconference at block 702. For example, a remote participant may call in to VTC system 110 using a designated call-in number and participant ID. A remote participant may use a remote device 150 to connect to VTC system 110 over a network, for example, via a designated uniform resource locator (URL). The remote participant may log in to VTC system 110 in some way such that VTC system 110 may identify the remote participant and be able to access organization server 170 for metadata about the remote participant. The log in may include, for example, an email address, a unique user name, a unique user ID, an employee ID, a phone number, and so forth. Once the remote participant is connected to VTC system 110, the participant's remote device 150 may begin transmitting a video feed, if a camera is available.

The logic flow 700 may retrieve metadata about the remote participant at block 704. For example, VTC system 110 may connect to organization server 170, e.g. using metadata retriever 230, and look up metadata about the remote participant, such as name, title, location, contact information, and so forth. VTC system 110 may then retrieve the metadata from the server. VTC system 110 may also connect to one or more third party sources 160 to search for metadata related to the remote participant and/or the remote participant's location, such as weather, news, social networking information, and so forth. In an embodiment, searches may be saved to a directory entry for the remote participant to enable faster retrieval of metadata in future occurrences. For example, a URL for weather specific to the participant's location may be saved to the participant's employee profile. Metadata retriever 230 may "follow" a participant's Twitter feed, or may store a link to the participant's blog or social networking page. Metadata retriever 230 may subscribe to real simple syndication (RSS) feeds for news from a news source local to the participant and may access that RSS feed directly rather than searching at each connection. In an embodiment, metadata retriever 230 may periodically or continuously check for new metadata, e.g. changing news headlines. The embodiments are not limited to these examples.

The logic flow 700 may build a consolidated video feed from the metadata and video from the remote participant at block 706. For example, VTC system 110 may, using video feed builder 240, combine the video feed from the remote participant's remote device 150 with some or all of the metadata retrieved for the remote participant into one consolidated video feed. Video feed builder 240 may format the metadata, for example, using a template, to present the metadata in text and/or graphic form in a visually pleasing manner. The metadata portion of the consolidated video feed may appear as a layer on top of the video feed or to a side of the video feed, e.g. on the bottom. Video feed builder 240 may update the metadata portion of the consolidated video feed periodically. For example, if local time is displayed, the time may update once per minute. If local news is included, then new headlines may replace older headlines. Video feed builder 240 may also change the types of metadata displayed periodically. For example, news, then social networking feeds, then weather, and so forth.

The logic flow 700 may select a dedicated position in a conference room for displaying the consolidated video feed at block 708. For example, VTC system 110 may determine how many displays 140 are available in conference room 102 and whether the display is being used or is needed for other information. VTC system 110 may then select an unused display for the consolidated video feed. If there are more consolidated video feeds than displays, VTC system 110 may instruct video feed builder 240 to combine the multiple consolidated video feeds into one video feed, for example, by dividing the video feed display area into sections and selecting one section for each consolidated video feed. In an embodiment, once a display or portion of a display is selected for a consolidated video feed, that display or portion thereof remains dedicated to that consolidated video feed for the duration of the connection. In an embodiment, when an event occurs in the conference room, such as a change in where the room participants are focusing their attention, the consolidated video feed may be moved from its current position to a new dedicated position in order to maintain the presence of the remote participant in the activity of the conference.

The logic flow 700 may display the consolidated video feed in the dedicated position at block 710. For example, VTC system 110 may provide the consolidated vide feed to the display driver for display at the dedicated position.

Figure 8:
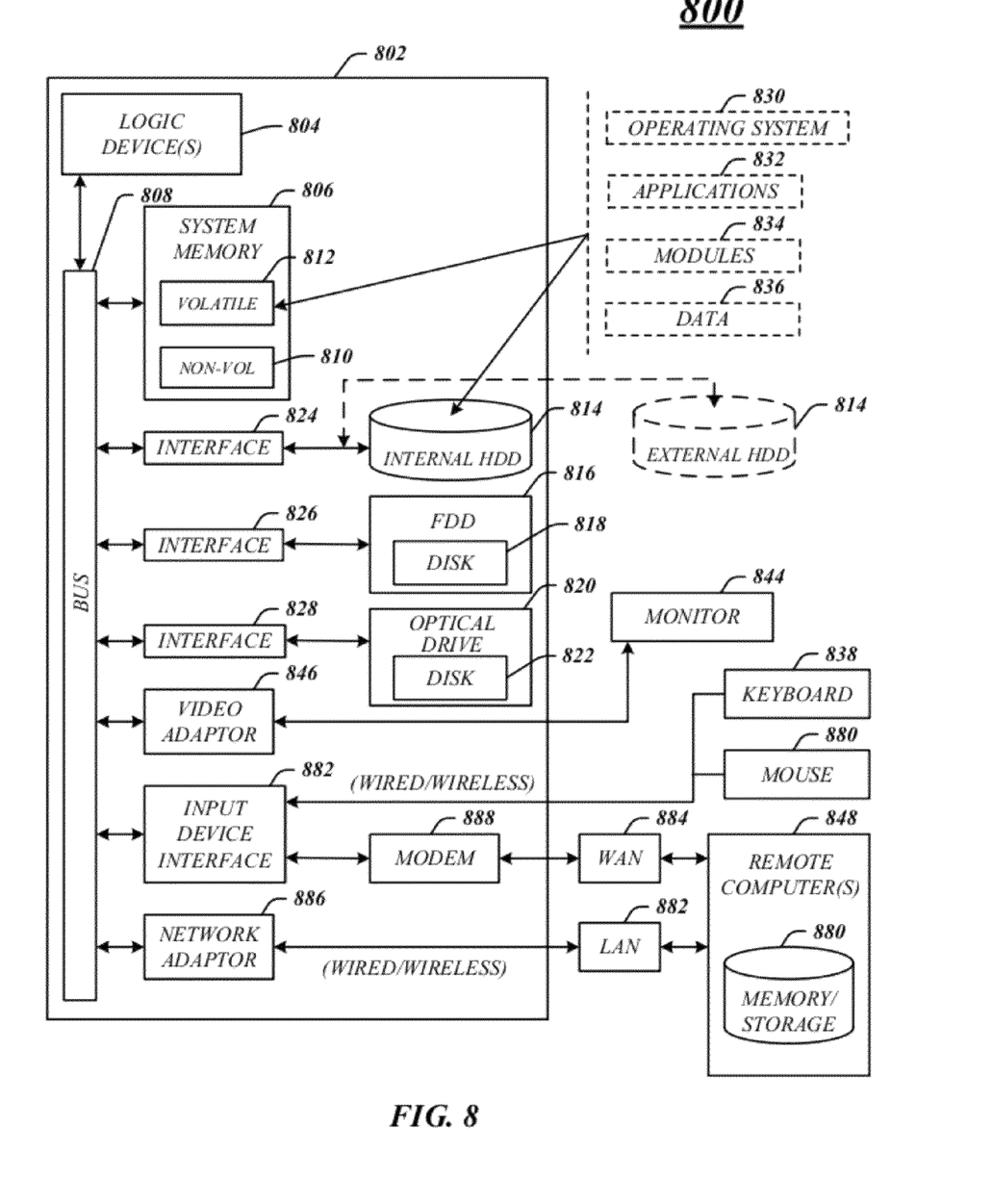
FIG. 8 illustrates an embodiment of a computing architecture.

FIG. 8 illustrates an embodiment of an exemplary computing architecture 800 suitable for implementing various embodiments as previously described. The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The system memory 806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. The one or more application programs 832, other program modules 834, and program data 836 can include, for example, the video conferencing module 210, metadata retriever 230, video feed builder 240 and event detector 250.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
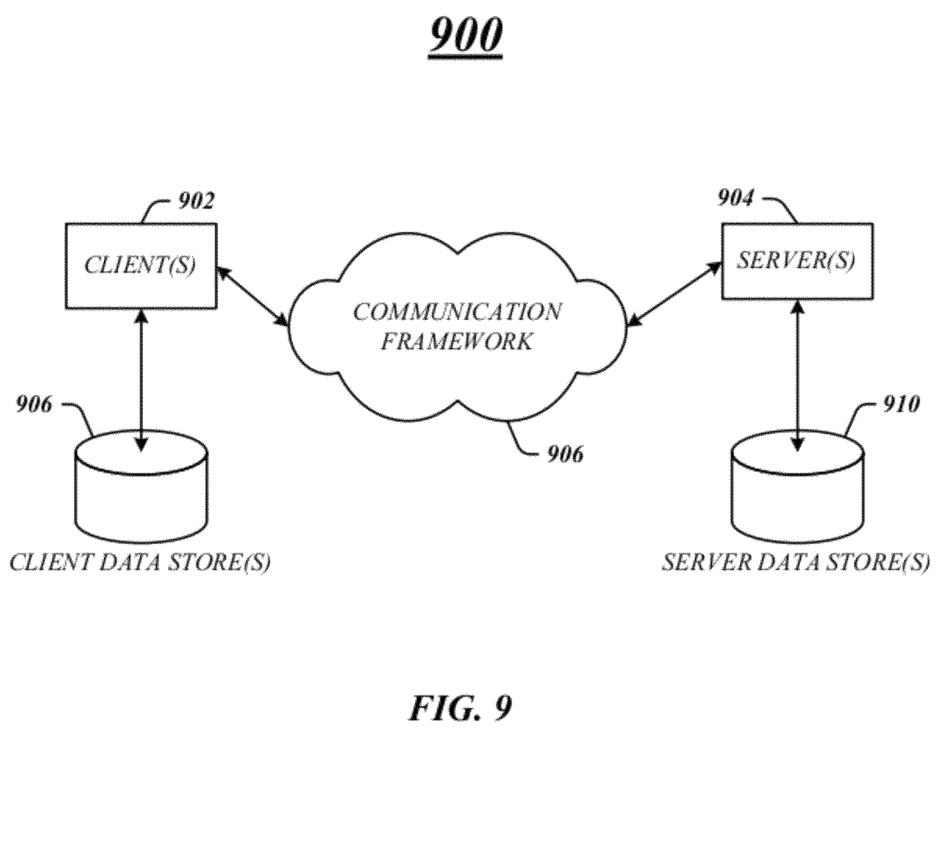
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the remote devices 150, and one or more components of VTC system 110. The servers 904 may implement the organization server 170, and one or more components of VTC system 110. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 902 and the servers 904 may include various types of standard communication elements designed to be interoperable with the communications framework 906, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 902 and a server 904 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, logic devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    receiving a connection from a remote participant to a video conference;
    retrieve metadata about the remote participant;
    determining how many displays are in a conference room;
    determining which of the displays are unused;
    selecting at least one unused display as a dedicated position in the conference room for displaying a video feed from the remote participant; and
    displaying, in the dedicated position, the video feed and the metadata about the remote participant.

2. The method of claim 1, wherein retrieving metadata comprises at least one of:
    accessing a communication client for the remote participant and retrieving information about the remote participant;
    accessing a presence information server and retrieving directory information about the remote participant; and
    accessing at least one third-party source and retrieving data relevant to the remote participant's location.

3. The method of claim 1, wherein the metadata comprises at least one of:
    a name, a title, a location name, location weather, a location news item, a location local time, and a social networking link.

4. The method of claim 1, further comprising:
    creating a video feed from a still image of the remote participant and the metadata, when there is no video from the remote participant.

5. The method of claim 1, wherein displaying the metadata and the video feed comprises at least one of:
    displaying on a dedicated display;
    displaying in a dedicated segment on a display; and
    displaying the metadata and video feed as one component of a compound video feed on one display, the compound video feed comprising at least two video feeds from different remote participants.

6. The method of claim 1, further comprising:
    receiving a selection from the remote participant of what metadata to display.

7. The method of claim 1, further comprising:
    moving the video feed and metadata display from the dedicated position to a second dedicated position in response to an event occurring in the conference room.

8. An article comprising a storage medium containing instructions that when executed cause a system to:
    receive a connection from a remote participant to a video conference;
    retrieve metadata about the remote participant;
    build a consolidated video feed from video information received from the remote participant and the retrieved metadata;
    determine how many displays are in a conference room;
    determine which of the displays are unused;
    select at least one unused display as a dedicated position in the conference room for displaying the consolidated video feed; and
    output the consolidated video feed for display in the dedicated position.

9. The article of claim 8, further comprising instructions that when executed cause the system to at least one of:
    access a communication client for the remote participant to retrieve information about the remote participant;
    access a presence information server to retrieve directory information about the remote participant; and
    access at least one third-party source to retrieve data relevant to the remote participant's location.

10. The article of claim 8, wherein the metadata comprises at least one of:
    a name, a title, a location name, location weather, a location news item, a location local time, and a social networking link.

11. The article of claim 8, further comprising instructions that when executed cause the system to: create the consolidated video feed from a still image of the remote participant and the metadata, when there is no video from the remote participant.

12. The article of claim 8, wherein the instructions to display comprise instructions that when executed cause the system to at least one of:
    display on a dedicated display;
    display in a dedicated segment on a display; and
    display the metadata and video feed as one component of a compound video feed on one display, the compound video feed comprising at least two video feeds from different remote participants.

13. The article of claim 8, further comprising instructions that when executed cause the system to: build the consolidated video feed using metadata for the remote participant according to a selection from the remote participant of what metadata to display.

14. The article of claim 8, further comprising instructions that when executed cause the system to: move the consolidated video feed display from the dedicated position to a second dedicated position in response to an event occurring in the conference room.

15. An apparatus comprising:
    a logic device;
    a metadata retriever operative on the logic device to retrieve metadata about a remote participant connecting to a video conference;
    a video feed builder operative on the logic device to build a consolidated video feed from video information received from the remote participant and the retrieved metadata to output the consolidated video feed for display; and
    a video conferencing module to receive a connection from the remote participant, to determine how many displays are in a conference room, to determine which of the displays are unused; and to select at least one unused display as a dedicated position in the conference room for displaying the consolidated video feed.

16. The apparatus of claim 15, further comprising:
    an event detector operative on the logic device to detect events in the conference room;

the video conferencing module further to move the consolidated video feed display from the dedicated position to a second dedicated position in response to an event detected in the conference room.

17. The apparatus of claim 15, the metadata retriever further to at least one of:
   access a communication client for the remote participant and retrieving information about the remote participant;
   access a presence information server and retrieve directory information about the remote participant; and
   access at least one third-party source and retrieving data relevant to the remote participant's location.

18. The apparatus of claim 15, the video feed builder further to build the consolidated video feed using metadata for the remote participant according to a selection from the remote participant of what metadata to display.

19. The apparatus of claim 15, wherein the metadata comprises at least one of:
   a name, a title, a location name, location weather, a location news item, a location local time, and a social networking link.

* * * * *